United States Patent [19]
Kirby

[11] 3,758,663
[45] Sept. 11, 1973

[54] SEPARATION OF LEAD-210 FROM POLONIUM-210 AND BISMUTH-210

[75] Inventor: Harold W. Kirby, Dayton, Ohio

[73] Assignee: The United States of America as represented by the United States Atomic Energy Commission, Washington, D.C.

[22] Filed: May 18, 1972

[21] Appl. No.: 254,703

[52] U.S. Cl. ............................. 423/2, 252/301.1 R
[51] Int. Cl. ............................................. G01g 57/00
[58] Field of Search ........................ 423/2, 87, 88; 252/301.1 R; 250/106 T

[56] References Cited
UNITED STATES PATENTS

| | | | |
|---|---|---|---|
| 2,873,170 | 2/1959 | Hyde et al. | 423/2 |
| 2,894,817 | 7/1959 | Karraker | 423/2 |
| 3,463,739 | 8/1969 | Schulz et al. | 252/301.1 R |
| 3,419,348 | 12/1968 | Hardy et al. | 423/2 |
| 3,271,320 | 9/1966 | Moore | 252/301.1 R |

*Primary Examiner*—Carl D. Quarforth
*Assistant Examiner*—F. M. Gittes
*Attorney*—Roland A. Anderson

[57] ABSTRACT

Separation of lead-210 from polonium-210 by disposing a solution containing at least two of the nuclides wherein one is lead-210 on a platinum substrate, evaporating the solutions and selectively leaching or desorbing the lead-210 with a reagent.

4 Claims, 1 Drawing Figure

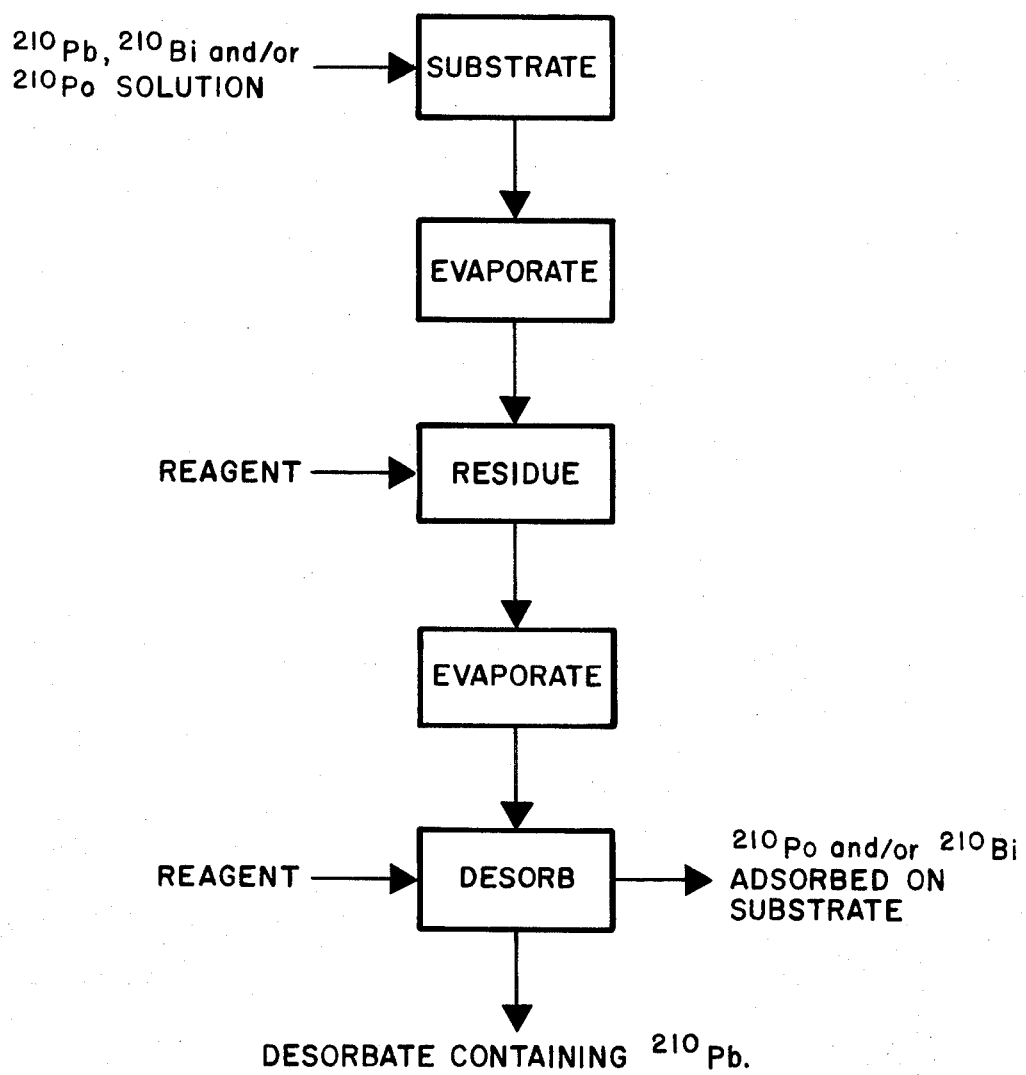

SEPARATION OF LEAD-210 FROM POLONIUM-210 AND BISMUTH-210

BACKGROUND OF INVENTION

The separation of lead-210 ($^{210}$Pb) from its daughters bismuth-210 ($^{210}$Bi) and polonium-210 ($^{210}$Po) is most desirable to successful use of the lead-210 nuclide in physical research programs conducted by government, university, and other research installations. Research applications require highly purified lead-210.

Prior methods, such as solvent extraction and anion exchange, used to separate lead-210 from the aforementioned decay products suffered from a number of disadvantages or drawbacks. Examples of disadvantages or drawbacks referred to are a difficulty or inability to derive a highly purified lead-210 product, and relatively large liquid volumes resulting in dilution of the product.

Thus, for the reasons such as hereinabove noted, it is desirable to provide an efficient separation process which overcomes the noted problems and provides a high purity lead-210 product.

SUMMARY OF INVENTION

In view of problems as noted above, it is an object of this invention to provide an improved process for separating lead-210 from its decay products polonium-210 and bismuth-210.

It is an object of this invention to provide a lead-210 separation process which yields high purity lead-210 product.

It is a further object of this invention to provide a novel lead-210 separation process wherein polonium-210 and bismuth-210 materials react with the substrate to facilitate lead-210 desorption.

Various other objects and advantages will appear from the following description of the invention and are particularly pointed out hereinafter in connection with the appended claims. Various changes in process flow, materials, etc., as described herein may be made by those skilled in the art without departing from the scope and principles of this invention as brought out in the appended claims.

The invention comprises a novel method of separating lead-210 from decay products by disposing a suitable solution containing said nuclides lead-210 and bismuth-210 and/or polonium-210 on a platinum substrate, evaporating said solution and selectively desorbing essentially lead-210 with a reagent.

DESCRIPTION OF DRAWING

The drawing illustrates steps in a preferred sequence for operation of this invention.

DETAILED DESCRIPTION

As shown in the drawing, a solution from which lead-210 is to be separated from polonium-210 and/or bismuth-210 may be disposed on a platinum substrate. Nuclide containing solutions suitable for use in disposing the nuclides onto the platinum substrate include any evaporable liquid or readily volatile acid, such as nitric, hydrochloric or acetic acids, in which the nuclides are soluble. Evaporable liquid or readily volatile nuclide containing solutions such as from about 1 N to about 6 N hydrochloric acid (HCl) and from about 1 N to about 6 N nitric acid (HNO$_3$) have been successfully used. Various substrates, such as tantalum, gold, iridium, copper and silver may be used but platinum may provide the highest and most favorable lead-210 desorption.

The nuclide solutions disposed on the substrate may then be evaporated so as to leave a dry residue on the substrate. Evaporation may be accelerated through various means such as heating the substrate, decreasing surface vapor pressure, and other similar methods well known in the art. Upon completion of evaporation, it may be desired to heat the substrate as an added assurance of complete evaporation. This heating should be maintained below a temperature of about 200°C to avoid volatilization of the polonium and preferably between about 80°C and about 110°C.

After evaporation of the nuclide solution, a metathesis solution or reagent taken from the group consisting of about 0.01 N to about 1 N solution of hydrochloric acid, nitric acid, acetic acid, ammonium acetate, ammonium chloride, ammonium nitrate and distilled water, may be disposed on the residue remaining on the substrate after evaporation and it also may be subsequently evaporated. The use of a reagent taken from the above group with the residue of the nuclide solution may promote conversion of the polonium and/or bismuth to a more insoluble form. This reagent may then be evaporated and dried using the same heating procedure as described hereinabove for the nuclide solution evaporation and drying.

After evaporation of the nuclide solution and, if used, of the reagent taken from the above listed group, the substrate may be washed in any suitable manner, such as by flooding, spraying, rinsing or the like, with a suitable reagent or desorbent solution to desorb the lead-210 nuclide. Desorption as herein used refers to the removal of a substrate (such as nuclide lead-210) from an adsorbed state. The washing as described above is in effect a method of separating the essentially lead-210 nuclide from the absorbed nuclides. Examples of reagents which may be used and which have been used with success are distilled water, less than about 1.0 N ammonium acetate, less than about 1 N ammonium chloride, less than about 0.1 N nitric acid, less than about 0.01 N hydrofluoric acid, less than about 1 N ammonium nitrate, less than about 1 N acetic acid, and preferably, in addition to distilled water, less than about 0.3 N ammonium acetate, between about 0.01 N and about 0.3 N ammonium chloride, less than about 0.05 N nitric acid, less than about 0.01 hydrochloric acid, and less than about 1 N ammonium nitrate. These preferred concentrations may also be used in the previous step in which one of these reagents is disposed on the residue and then this reagent evaporated in the same manner as the nuclide solution was evaporated. The number of times that the substrate is washed will depend upon individual methods used, degree of retention of lead-210 after washing, purity required of lead-210, etc. Two or more washings may be preferred. Although desorbing or leaching may be conducted at ambient temperature, it may be preferred to use the temperature range of from about 80°C to about 100°C.

The method of preparing the surface of the platinum substrate may be a factor in this separation process. For example, platinum substrates which may have been covered with hydrochloric acid and subsequently heated and then rinsed with distilled water and dried at about 95°C desorb more polonium-210 and bismuth-210 than surfaces which may not have had this hydrochloric acid surface preparation treatment. This may indicate that the adsorption of the polonium on the platinum substrate is not merely a residue adsorption process but involves a chemisorption process, i.e., a process wherein there is both a chemical reaction and adsorption on the substrate surface. Since platinum oxides may be partially dissolved by the heated hydrochloric acid in the cleaning procedure, the oxide film may be removed, therefore possibily limiting the extent to which the polonium-210 could react and become bonded to the platinum surface. Conversely, ignition of the platinum increases the amount of platinum dioxide ($PtO_2$) on the substrate surface thereby permitting greater bonding between the polonium-210 and the substrate. Therefore, substrates may be prepared prior to use by heating to a red heat (~ 800°C) to enhance the bonding of the $^{210}Bi$ and $^{210}Po$ to the substrate surface.

In Table I, percent adsorption of the various nuclides is noted while using various reagents. Substrate Number 15 was pretreated with hydrochloric acid as described above and resulted in a substantial increase in polonium-210 desorption over substrate sample Number 16 which was not acid pretreated.

As noted in Table I, use of about 0.1 N ammonium chloride (Substrate No. 7) was successful in separating lead-210 from the other two nuclides. Reagents used with substrates 1, 2, 3 and 8 were also successful although in a more limited way than the reagent used with substrate Number 7. Although Table I shows examples of high bismuth-210 and in some cases, polonium-210 removal, these are shown merely for the purpose of illustration as to the lower and upper limits. One using this invention would draw from the worktable and more efficient examples. The temperature reference in Table I refers to the temperature to which the platinum was heated to dispose the solution on the substrate. The temperature at which reagents for desorbing were evaporated may not be critical except to assist in evaporation of the solutions from the substrate and to dry the substrate prior to final desorbing.

TABLE I
Separation of Lead-210 From Polonium-210 and Bismuth-210 by Desorption From Platinum With Various Reagents

| Substrate No. | Reagent for Desorbing | Maximum Temp. °C | Quantity Desorbed (percent) | | | Notes |
|---|---|---|---|---|---|---|
| | | | $^{210}Po$ | $^{210}Bi$ | $^{210}Pb$ | |
| 1 | $H_2O$ | 95 | 0.0 | 4.4 | 51.0 | (a) |
| 2 | 0.1N $CH_3COONH_4$ | 200 | 0.08 | 5.3 | 79.4 | (a) |
| 3 | 0.01N $CH_3COOH$ | 95 | 0.0 | 4.3 | 95.8 | (a) |
| 4 | 0.1N $CH_3COOH$ | 95 | 0.1 | 16.9 | 98.9 | (a) |
| 5 | 0.1N $CH_3COONH_4$ | 200 | 0.0 | 14.0 | 92.4 | (a) |
| 6 | 1N $CH_3COOH$ | 95 | 0.2 | 95.7 | 98.9 | (a) |
| 7 | 0.1N $NH_4Cl$ | 200 | 0.01 | 2.5 | 90.9 | (a) |
| 8 | 0.1N $NH_4NO_3$ | 200 | 0.0 | 3.4 | 92.2 | (a) |
| 9 | 0.01N $HNO_3$ | 95 | 1.4 | 19.9 | 99.0 | (b) |
| 10 | 0.1N $HNO_3$ | 95 | 22.9 | 84.5 | 99.8 | (a) |
| 11 | 3N $HNO_3$ | 95 | 77.5 | 99.6 | 99.9 | (a,c) |
| 12 | 0.0001N HCl | 95 | 0.0 | 30.9 | 87.2 | (b) |
| 13 | 0.01N HCl | 95 | 0.0 | 43.3 | 99.6 | (a) |
| 14 | 0.1N HCl | 95 | 1.4 | 96.9 | 99.8 | (a) |
| 15 | 1N HCl | 95 | 39.9 | 99.8 | 99.9 | (a,f) |
| 16 | 1N HCl | 95 | 1.1 | 99.1 | 99.8 | (a) |

Footnotes:
a Deposited from 1N HCL solution.
b Deposited from 1N $HNO_3$ solution.
c Preliminary deposition and evaporation of distilled water on nuclide solution residue before desorbing.
f Platinum was pretreated with 1N HCL before deposition.

TABLE II
Desorption of Lead-210, Bismuth-210 and Polonium-210 From Various Metal Surfaces

| Substrate No. | Surface | Desorption Reagent | Quantity Desorbed (percent) | | | Notes |
|---|---|---|---|---|---|---|
| | | | $^{210}Po$ | $^{210}Bi$ | $^{210}Pb$ | |
| 1 | Gold | 0.1N $NH_4Cl$ | 7.7 | 52.2 | (f) | (c) |
| 2 | Gold | 0.0001N HCl | 17.0 | 60.7 | (f) | (d) |
| 3 | Gold | 0.01N HCl | 9.3 | 92.7 | 97.9 | |
| 4 | Gold | 0.1N HCl | 86.3 | 99.0 | 99.7 | (a,b) |
| 5 | Tantalum | 0.1N HCl | 43.1 | 91.1 | 97.8 | (b) |
| 6 | Iridium | 0.1N HCl | 24.3 | 95.9 | 98.9 | |
| 7 | Copper | 1N HCl | 0.1 | 48.4 | 91.5 | |
| 8 | Copper | 1N HCl | 2.0 | 97.6 | 100.0 | (e) |
| 9 | Silver | 0.1N HCl | 0.1 | 37.6 | 91.5 | |
| 10 | Silver | 1N HCl | 0.2 | 66.5 | 97.6 | |
| 11 | Silver | 1N HCl | 0.0 | 99.7 | 99.8 | (e) | a Water disposed on evaporated residue and evaporated prior to desorption.
b Substrate ignited at red heat and cooled before disposing nuclide solution.
c Maximum temperature – 200°C.
d Heated 1 hour at 95° after disposing nuclide solution before desorption.
e Not evaporated to dryness. Solution removed after 1 hour at 25°C.
f Data not available.

The tenacity of polonium to a substrate is not limited to platinum but, as is illustrated in Table II, this tenacity also exists using other substrates. These samples shown in Table II were disposed from a 1N hydrochloric acid solution.

As indicated by Table II, separation on gold surfaces appears to follow a pattern more characteristic of physical adsorption. However, because of the relatively low softening point of gold, it was feasible to prepare the gold foils prior to deposition of the nuclide containing solution by igniting the gold foils only briefly. The tantalum and iridium foils were ignited to red heat (~200°C) and did adsorb the polonium more tenaciously than gold but less so than platinum.

Again in Table II, silver and copper showed a distinct adsorption effect, in addition to the usual electrolytic one. Thus the desorption of bismuth was essentially quantitative when the solution was not evaporated to dryness (Table II Number 8) but only half the bismuth-210 could be desorbed after it had been dried and in close contact with the copper surfaces. Silver appears to react similarly to copper.

It has been found that using the above described procedure comprising this invention, lead-210 may be efficiently removed from its daughters bismuth-210 and polonium-210 yielding a high degree of purity lead-210. Efficiency of lead-210 removed may be about 92 percent or higher.

What is claimed is:

1. The method for separating nuclide lead-210 from nuclides bismuth-210 and polonium-210 comprising disposing on a platinum substrate a solution of evaporable liquid which contains at least one liquid selected from the group consisting of distilled water, from about 1 N to about 6 N hydrochloric acid, and from about 1 N to about 6 N nitric acid, and the nuclide lead-210 and at least one of the others of said nuclides; evaporating said liquid to dryness; and desorbing nuclide lead-210 from said substrate by applying thereto a reagent taken from the group consisting of distilled water, less than about 0.3 N ammonium acetate, between about 0.01 N and about 0.3 ammonium chloride, less than about 0.01 N hydrochloric acid, less than about 0.05 N nitric acid, less than about 1 N ammonium nitrate, and less than about 0.2 N acetic acid, said desorbing reagent containing said desorbed nuclide lead-210 after applying said desorbing reagent to said platinum substrate and said platinum substrate retaining said at least one of the others of said nuclides.

2. The method of claim 1 together with heating said reagent to a temperature between about 80°C and 100°C during said desorbing.

3. The method of claim 1 together with heating said substrate to a temperature greater than about 750°C and then cooling it to temperature between about 22°C and 25°C before disposing thereon said solution of evaporable liquid.

4. The method of claim 1 together with, subsequent to said evaporating and prior to said desorbing, the preliminary steps of disposing on said substrate said desorbing reagent and evaporating volatile constituents therefrom.

* * * * *